(12) United States Patent
LeVasseur et al.

(10) Patent No.: US 7,263,409 B2
(45) Date of Patent: Aug. 28, 2007

(54) METHOD AND APPARATUS FOR TRACKING A LOAD ON A CONVEYOR SYSTEM

(75) Inventors: Brian C. LeVasseur, Pinckney, MI (US); Ryann A. Dishaw, Spring Arbor, MI (US); Lyle A. Henderson, Howell, MI (US); Todd E. Alderman, Ann Arbor, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 0 days.

(21) Appl. No.: 10/652,576

(22) Filed: Aug. 29, 2003

(65) Prior Publication Data

US 2005/0049745 A1 Mar. 3, 2005

(51) Int. Cl.
*G06F 7/00* (2006.01)
(52) U.S. Cl. .................. 700/228; 700/112; 198/459.1; 198/460.1; 198/464.1; 198/464.2; 198/464.3; 198/571; 198/572
(58) Field of Classification Search ................ 700/112, 700/115, 215, 225, 226, 228, 229; 198/459.1, 198/460.1, 464.1–464.4, 571, 572, 575–577
See application file for complete search history.

(56) References Cited

U.S. PATENT DOCUMENTS

| 3,747,781 A | 7/1973 | Daigle et al. |
| 3,817,368 A | 6/1974 | Wentz et al. |
| 3,868,643 A | 2/1975 | Bullivant |
| 3,960,262 A | 6/1976 | Henig |
| 4,197,935 A | 4/1980 | Aterianus et al. |
| 4,331,328 A | 5/1982 | Fasig |
| 4,360,098 A | 11/1982 | Nordstrom |
| 4,604,704 A | 8/1986 | Eaves et al. |
| 5,038,911 A | 8/1991 | Doane et al. |
| 5,038,915 A | 8/1991 | Delsanto |
| 5,086,910 A | 2/1992 | Terpstra |
| 5,092,451 A | 3/1992 | Jones et al. |
| 5,097,939 A | 3/1992 | Shanklin et al. |
| 5,267,638 A | 12/1993 | Doane |
| 5,318,167 A | 6/1994 | Bronson et al. |
| 5,335,777 A | 8/1994 | Murphy et al. |
| 5,341,916 A | 8/1994 | Doane et al. |
| 5,441,143 A | 8/1995 | Hosel |
| 6,021,888 A | 2/2000 | Itoh et al. |
| 6,230,872 B1 * | 5/2001 | Huang et al. ............ 198/368 |
| 6,460,683 B1 | 10/2002 | Pfeiffer |
| 6,711,461 B2 * | 3/2004 | Flores ...................... 700/223 |
| 2002/0175049 A1 | 11/2002 | Flores |

OTHER PUBLICATIONS

International Search Report dated Sep. 28, 2005 for PCT International Application No. PCT/US04/24422 filed Jul. 29, 2004 for "Method And Apparatus For Tracking A Load On A Conveyor System" (2 pages).

* cited by examiner

*Primary Examiner*—Khoi H. Tran
(74) *Attorney, Agent, or Firm*—Dickinson Wright PLLC (57) ABSTRACT

A method and apparatus for tracking a load on a conveyor system using the trailing edge of the load. The method includes the steps of sensing the trailing edge of the load with a first sensor and updating a load record for the load in response to sensing the trailing edge of the load with the first sensor. The apparatus may include a conveyor, a controller, and a sensor in communication with the controller for sensing the trailing edge of a load on the conveyor.

17 Claims, 8 Drawing Sheets

| |
|---|
| Unique Load Identification Number |
| Barcode Tag String |
| Distance From Next Sensor |
| Load Weight/Length |
| Desired Destination Station |
| Any Other Load Related Information |

Exemplary Load Record Figure

Fig. 7

METHOD AND APPARATUS FOR TRACKING A LOAD ON A CONVEYOR SYSTEM

BACKGROUND OF THE INVENTION

The present invention is directed to a conveyor load tracking system for tracking a load between processing stations, and more particularly to a system and method for tracking a load using the trailing edge of the load.

In the fields of material handling, industrial processing, and baggage systems, automated equipment is used to transport loads automatically through various processing steps. Typically, as loads move on a transportation system, such as conveyors, it is necessary to track each load and any data that is associated with a particular load as well as to control the conveyor. The conveyor may be made up of various conveyor segments, and it may be desirable to control each segment individually as well as track the load as it moves from conveyor segment to conveyor segment. For example, certain control requirements, such as destination station processing rates, load spacing on the conveyor, and selective destinations, may require the controller to start and stop conveyor segments independently, or independently vary conveyor segment speeds.

One common method used to track loads and control conveyors involves sensing the leading edge of the load. As the leading edge of the load is sensed, a load record associated with the load is created and selectively transferred by the controller into lists associated with each conveyor segment or area. Accurate tracking requires that the transfer of the records in the controller and data structure reflect the physical position of the load in the system. While this "leading edge" tracking technique is generally suitable for many applications, particularly when the loads have a common and consistent size and shape (e.g., pallet conveying systems), this technique is subject to ghost loads and race conditions as hereinafter described when used in systems transporting loads of varying sizes and shapes.

One problem associated with using the leading edge for both tracking and control purposes is that certain conveyor control conditions may lead to inaccurate tracking. For example, referring to FIG. 1(a), when a leading edge of a load X is sensed by a sensor B at the end of a conveyor segment C1, the system commonly transfers the load record to the list associated with the next conveyor C2. However, if control conditions require the stopping of conveyor C1 upon sensing the leading load edge of the load while continuing to drive conveyor C2, the encoder E for conveyor C2 continues to pulse and the expected window for load X moves forward on conveyor C2 even though the physical load is stationary at the discharge end of conveyor C1, thereby creating a ghost load in the list of conveyor C2.

One technique for addressing this type of ghost condition is to track both the leading edge and trailing edge of a load. When the leading edge of load X is detected by sensor B, the load record is updated and placed into a holding area associated with sensor B. Upon sensing the trailing edge of the load, the load record is released from the sensor B holding area to the list or data array for conveyor C2. This delay requires determining the size of the load in order to locate the leading edge of load X. To determine the size of the load, the number of encoder pulses is counted between the leading and trailing edges. One problem with this system is that it significantly increases the demands on the controller or processor. Therefore, to maintain operational efficiency, generally more complex and expensive controllers must be installed to track and control the system.

Figure 1A:
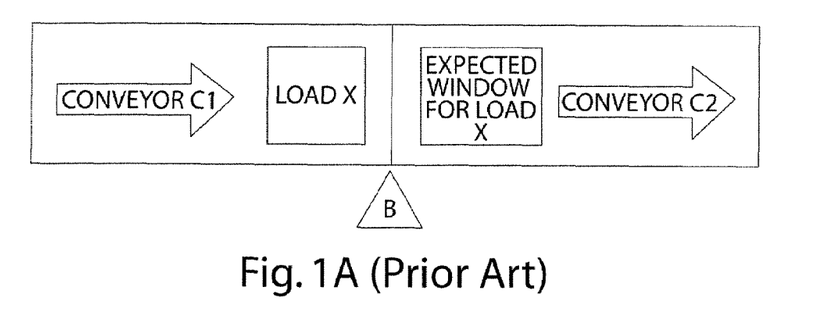
FIG. 1a is a schematic illustration of a baggage handling system section showing a leading edge detection system tracking a ghost load.
Figure 1B:
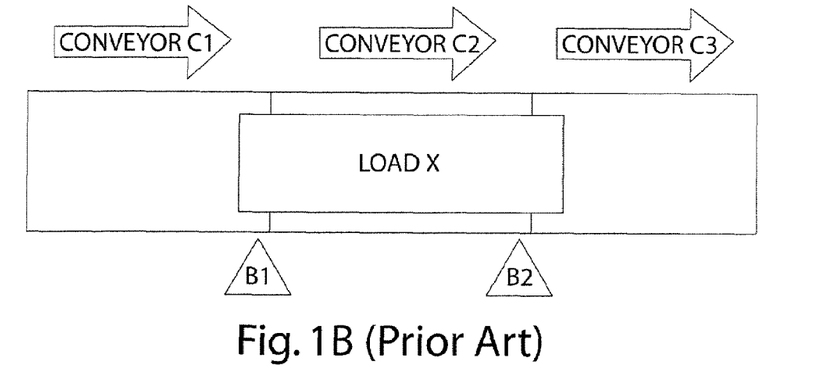
FIG. 1b is a schematic illustration of a baggage handling system section showing an error condition in a tracking system using both leading and trailing edges for a load greater than the spacing between the sensors.

Leading and trailing edge approaches are also used with two sensor arrangements, such as that shown in FIG. 1(b). While this approach is appropriate in many instances, it breaks down if the maximum load length is greater than the spacing between sensors. That is, when sensor B2 detects the lead edge of the load, the controller will attempt to transfer the load record from the front of the list for conveyor C2 to the holding area for sensor B2. However, because sensor B1 has not yet detected the trailing edge of load X, the controller has not transferred the load record from the holding area for sensor B1 to the list for conveyor C2 and therefore no load record is present in the list for conveyor C2. In this condition, the system creates a new load record for the unexpected load. Therefore, when sensor B1 detects the trailing edge of load X, the load record is transferred from the holding area for sensor B1 to the list for conveyor C2. Since the expectation window for the leading edge of load X is calculated as being past sensor B2, the load record is removed from the model for failing to arrive at sensor B2. These additional steps of creating and deleting load records to compensate for loads having a maximum length greater than the spacing between the sensors further increases the demands on the controller or processor and increases the probability of errors in tracking.

Figure 1C:
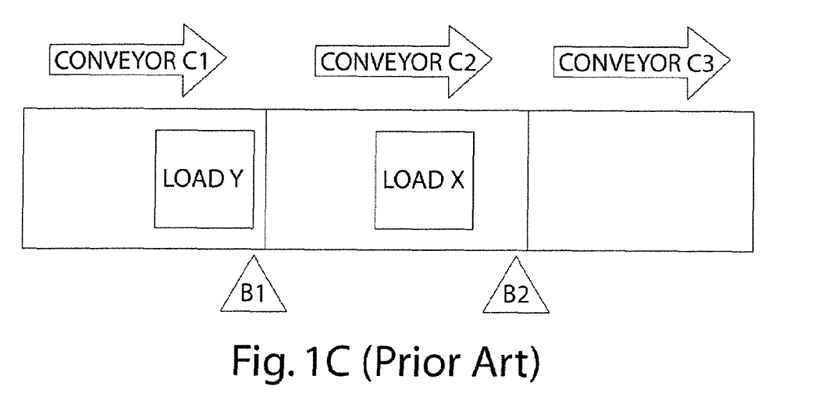
FIG. 1c is a schematic illustration of a baggage handling system section showing a collision event in a tracking system using a selective mixture of leading and trailing edges of small loads.

The condition discussed with reference to FIG. 1(b) may be overcome by configuring the system such that sensor B1 does nothing when it detects the trailing edge of load X and, when sensor B2 detects the lead edge of load X, the system transfers the record at sensor B1 rather than the record at the front of the list for conveyor C2. However, as is shown in FIG. 1(c), this solution creates a race condition when the distance between leading edges of consecutive loads is smaller than the distance between sensors. For example, if two short length loads X and Y are traveling on the conveyor as shown, sensor B1 detects the lead edge of load X and updates the record to indicate that it is at sensor B1. As noted above, the controller does not update any records or lists when sensor B1 detects the trailing edge of load X. Therefore, if the leading edge of load Y is detected at sensor B1 before the leading edge of load X is detected at sensor B2, a collision occurs in the tracking model, specifically the load record for load Y attempts to overwrite the load record for Load X in the holding area for sensor B1.

Figure 1D:
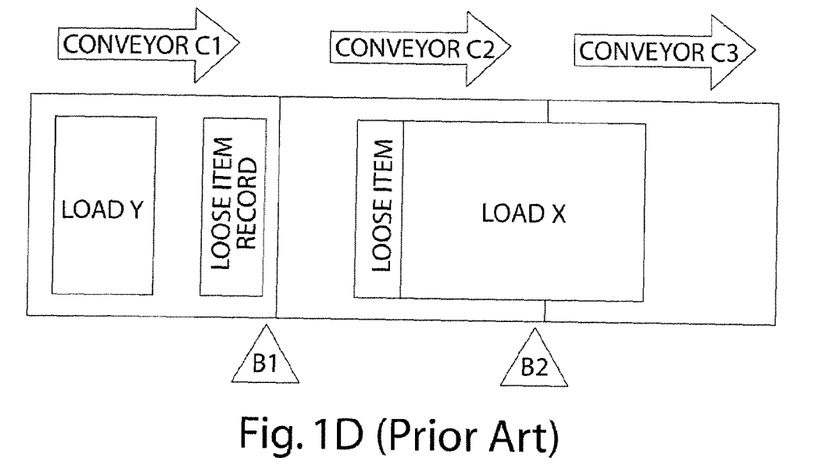
FIG. 1d is a schematic illustration of a baggage handling system section showing a collision event in a tracking system using a selective mixture of leading and trailing load edges in the presence of unexpected events.

In addition, as shown in FIG. 1(d), the above solution of ignoring the trailing edge at sensor B1 also breaks down if a strap, tag, or other loose item attached to load X is detected by sensor B1 but not by sensor B2 and the race condition noted above is satisfied. For example, sensor B1 detects the leading edge of load X and updates the record to indicate it is at sensor B1. Sensor B2 then detects the leading edge of load X and updates the record to indicate it is no longer at sensor B1 but rather at sensor B2. Next, the leading edge of a loose item attached to the trailing edge of load X is detected at sensor B1 and a new load record is created at sensor B1. Subsequently the loose item shifts and is not detected independently from the trailing edge of load X by sensor B2. As noted above, the controller does not update any records or lists when sensor B1 detects the trailing edge of new load, and since it is never detected at sensor B2, it remains in the holding area for sensor B1. When the leading edge of load Y is detected at sensor B1, a collision occurs in the tracking model as noted above In summary, various methods have been employed with a limited degree of success to overcome and minimize the deficiencies in the prior art and a need exists for a simple solution that effectively tracks the load without adding additional control steps, while eliminating or reducing the potential for ghost loads, race conditions, or tracking collisions.

SUMMARY OF THE INVENTION

The present invention is directed to a conveyor load tracking system for tracking a load between processing stations, and more particularly to a system and method for tracking a load using the trailing edge of the load. The method allows tracking a load, having a trailing edge and a leading edge, on a conveyor system having a first sensor. The method includes the steps of sensing the trailing edge of the load with the first sensor and updating a load record for the load in response to sensing the trailing edge of the load with the first sensor. The method allows use of only the trailing edge to track the load along the conveyor system to eliminate problems associated with tracking the leading edge or tracking the leading and trailing edge of a load.

In an alternative embodiment, the method may include the steps of sensing the trailing edge of the load with a source load sensor, updating a load record in a controller in response to sensing the trailing edge of the load, generating a pulse signal having a number of pulses directly proportional to the travel of the load on the first conveyor segment, and tracking the load on the first conveyor segment using the generated pulse signal and load record updated in response to sensing the trailing edge of the load.

The conveyor system generally includes a first conveyor segment, a second conveyor segment arranged relative to the first conveyor segment to transfer the load from the first conveyor segment to the second conveyor segment, a sensor configured sense the trailing edge of the load, and a controller configured to transfer load records from a first data array associated with said first conveyor segment to a second data array associated with said second conveyor segment in response to the sensor sensing the trailing edge of the load.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 3:
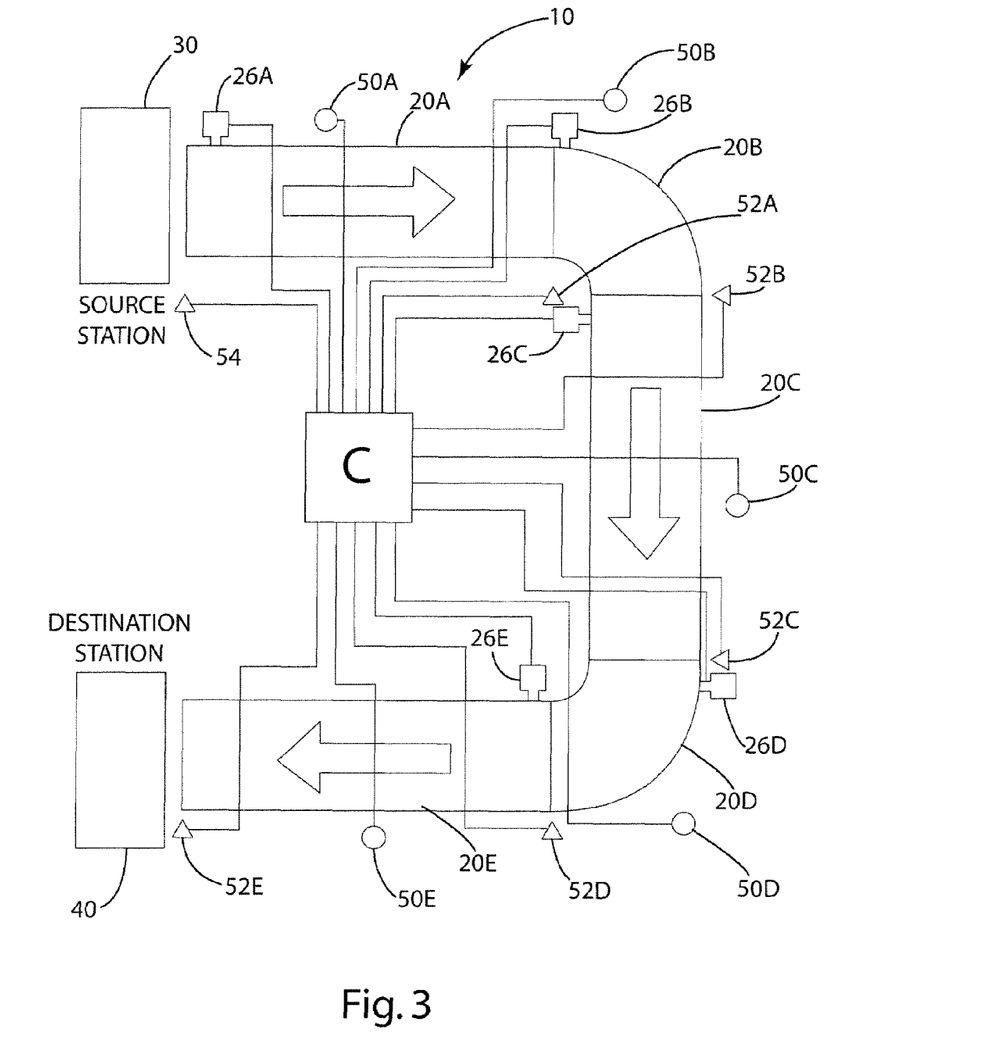
FIG. 3 is a schematic illustration of a baggage handling system for a multiple segment conveyor system having a load tracking apparatus constructed in accordance with the present invention.
Figure 4:
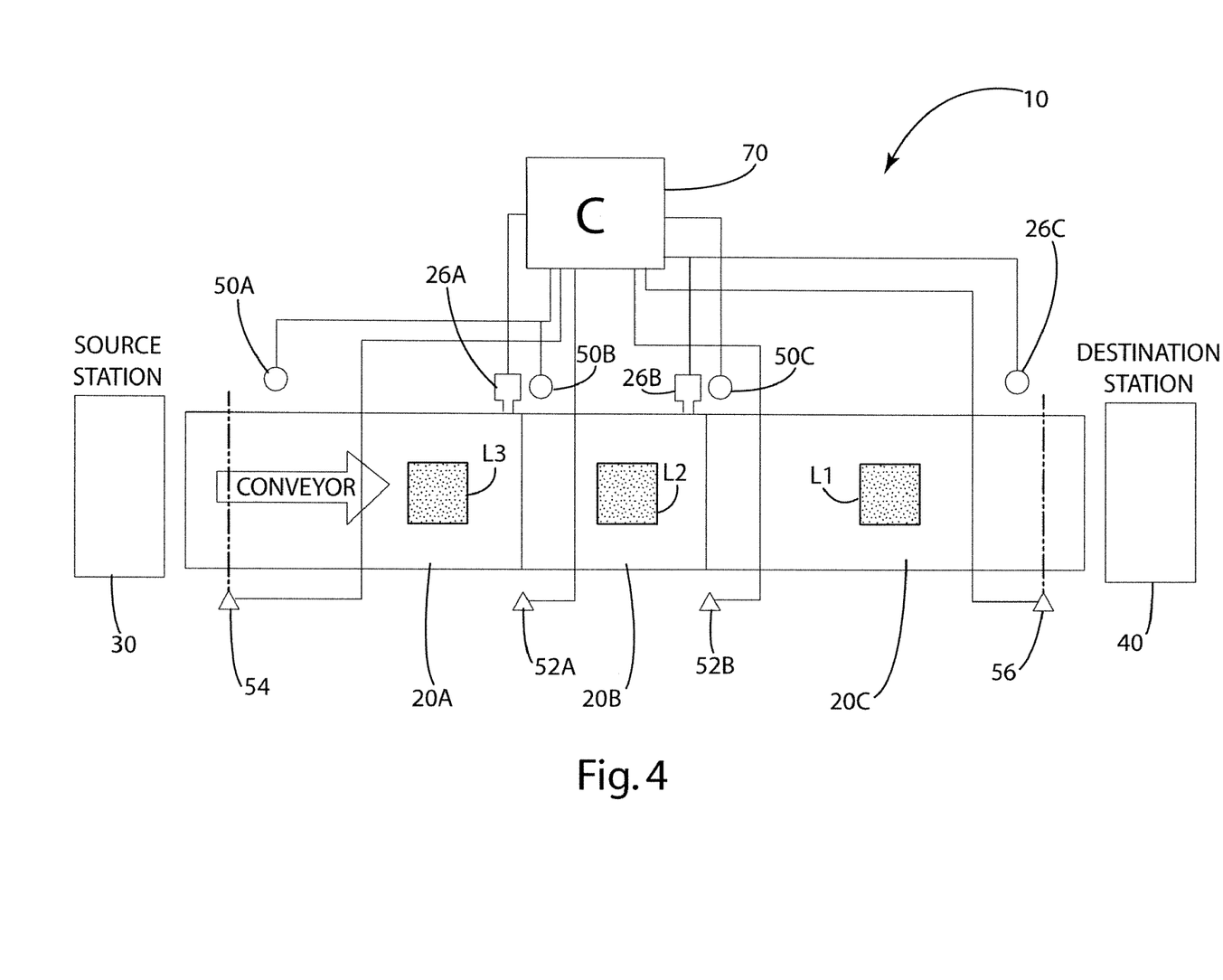
FIG. 4 is a schematic illustration of the baggage handling system, illustrating a potential physical layout of loads.
Figure 5:
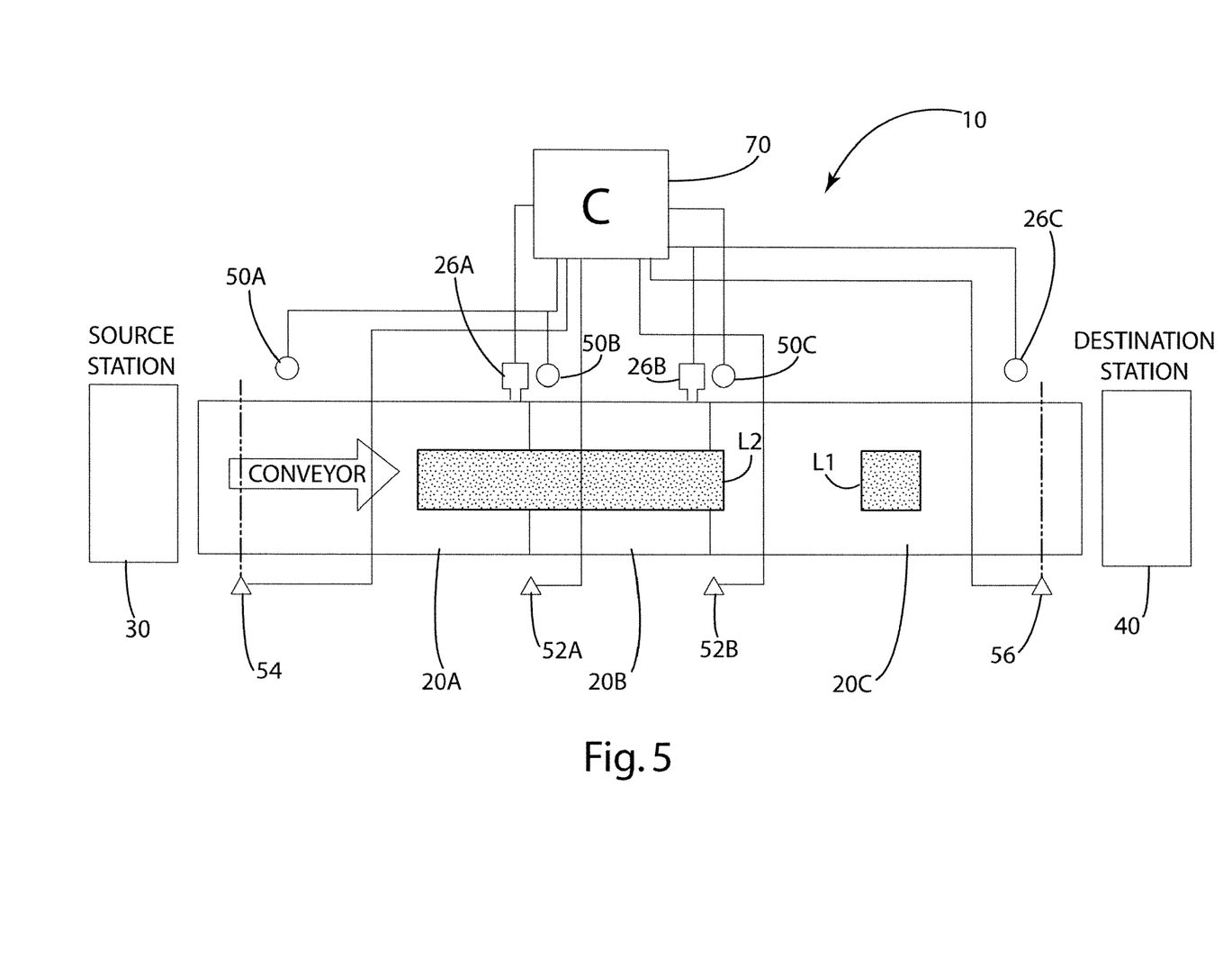
FIG. 5 is a schematic illustration of the baggage handling system in FIG. 4 illustrating various sized loads being tracked.

A conveyor system 10 according to the present invention is generally illustrated in FIGS. 3-5. The system 10 includes a plurality of interconnected conveying structures or segments such as the illustrated belt conveyor 20 driven by a motor 26, configured to transport loads between source and destination stations 30 and 40. The conveyor system 10 includes a controller 70 connected to one or more encoders 50 and sensors 52. As is illustrated in FIG. 3, the system 10 generally includes numerous conveying sections for selectively transporting loads between a variety of source and/or destination stations. For ease of reference, each conveyor section and the associated motor, encoder, and sensors associated therewith are indicated by an appropriate alphabetical designation, such as 20a, 20b, and 20c for the individual conveyor segments. The controller 70 operably communicates with the motor 26, encoder 50, and the sensors 52 of each conveyor segment to control the operation of the system and track loads as hereinafter described. In general, the controller 70 performs a control function for individually controlling the conveyor segments 20 and a tracking function for tracking a load along the individual conveyor segments. The tracking function of the controller uses a trailing edge technique described herein to track the load on the individual conveyor segments.

With reference to FIG. 3, the conveyor segments 20 are driven by a motor or motors 26a-26e, which are controlled by controller 70. The encoders 50a-50e generally mount on a shaft of the conveyor idler pulley and produces pulse signals which are communicated to the controller 70. The period of these pulses is directly proportional to the speed of a conveyor segment; for example, conveyor segment 20a travels a fixed distance in the time between the occurrence of two adjacent pulses of the first encoder 50a.

At one end of the first conveyor segment 20a is a source station 30 including a source station load sensor 54. Even though not illustrated, multiple source stations may be used to provide loads to the conveyor segments 20, or multiple source stations may feed onto additional segments (not illustrated) which in turn provide the load to a particular conveyor segment. At the other end of the conveyor segments 20 is a destination station 40. A sensor 52 at the end of the conveyor segments may act as a destination station load sensor. Multiple destination stations may also be used in the present invention.

Figure 2:
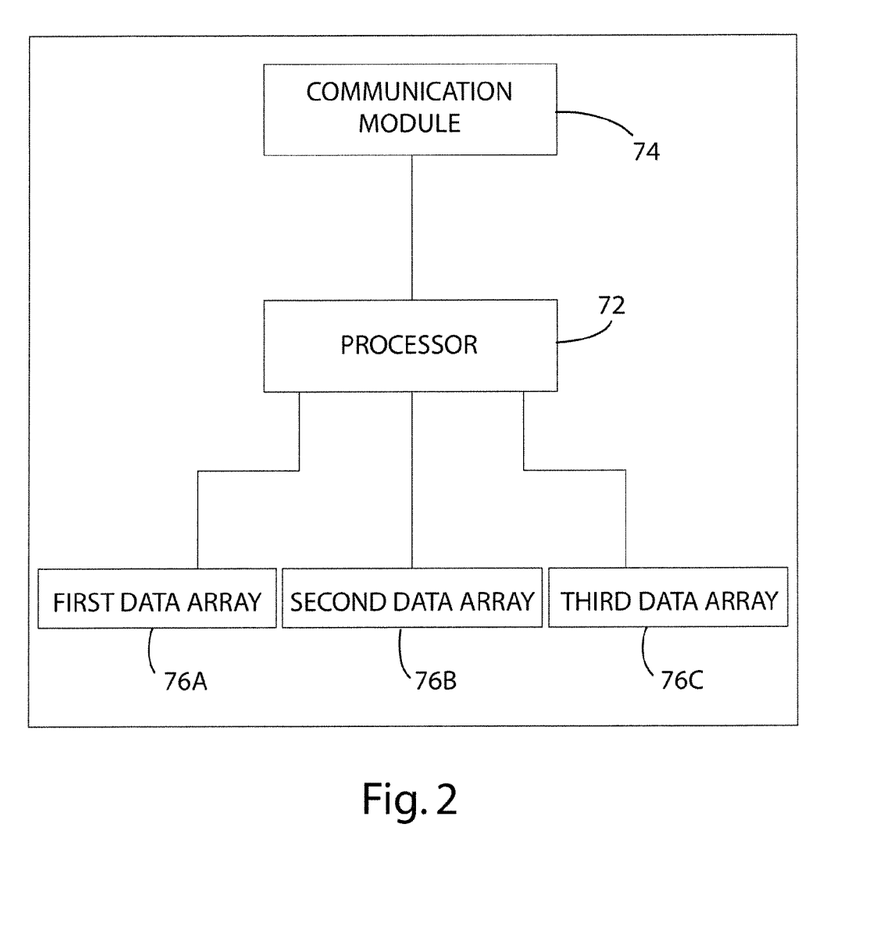
FIG. 2 is flow diagram illustrating data interfacing between a processor, communication module, a first data array and a second data array.

The controller 70, also referred to herein as a processor, may be an appropriately programmed microprocessor, a PLC, or any other suitable control module. The controller 70 operably communicates with the encoder 50, sensors 52, and motor 26 to control the conveyor segments 20 as well as track individual loads along each conveyor segment. As illustrated in FIG. 2, the controller 70 may include a processor 72, a communication module 74, and a data array 76. The data array 76 may be created in the memory of the controller 70. The controller may be any controller suitable for tracking loads on a conveyor system using the trailing edge of the load.

Figure 7:
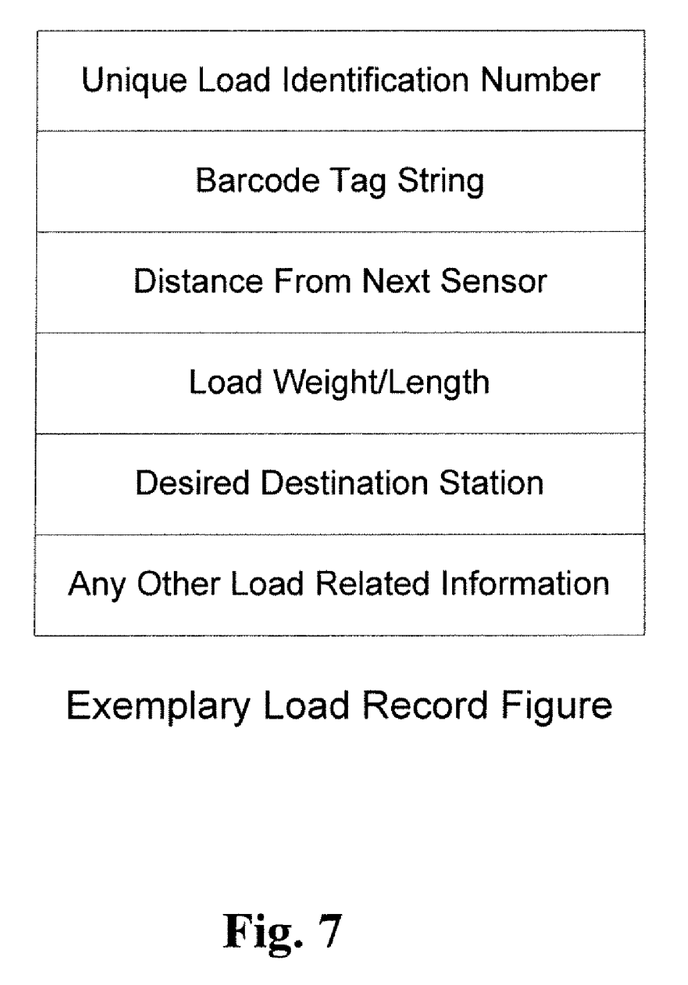
FIG. 7 is an illustration of the information tracked in an exemplary load record.

The controller 70 receives signals from the individual sensors 52 upon each sensor sensing the trailing edge of a load. Upon receiving the signals from the sensors 52, the controller may generate or update a load record in the data array 76. More specifically, upon sensing the trailing edge of a load by the source station load sensor 54, a load record is generated and inserted into a first data array 76*a*. Although one data array may be used for all conveyor segments, in the illustrated embodiment, the controller creates specific data arrays 76 assigned to a particular conveyor segment. The data array may be a list of ordered load records corresponding to the loads on the conveyor segments 20. In the illustrated embodiment, the list is consecutively ordered in a linked list management scheme according to the order of the loads on the conveyor segments. Each load record contains the data to be tracked with the load and information about the position of the load on the conveyor segment. An exemplary load record may be seen in FIG. 7. Therefore, as the load is physically moved from one conveyor segment to another conveyor segment, the controller also transfers the associated load record between data arrays.

As stated above, the sensors 52 may be any suitable sensing device, such as a photocell, limit switch, proximity sensor or the like. In the illustrated embodiment, while the sensors 52 sense both the trailing edge and leading edge of a load, the controller 70 only uses the trailing edge of the load for tracking purposes. In the illustrated embodiment, the sensors 52 are photocells and sense the trailing edge when the photocell's light source is a reflected by a reflective surface mounted on the opposing side of the conveyor after the trailing edge of the load has passed so that the load is no longer stopping the reflection of the photocell's light source from the reflective surface. In some embodiments, the controller may use the leading edge of a load in controlling the operation of conveyor segments while the trailing edge is used for tracking.

Before turning to a description of the tracking function of the present invention, it is noted that many of the benefits and advantages of the present invention are described herein with reference to a trailing edge detection system for load tracking and conveyor control. A representative system that may be modified to use a trailing edge in place of a leading edge detection system is illustrated and described in detail in U.S. Pat. No. 5,335,777, entitled "Method And Apparatus For Belt Conveyor Load Tracking," issued Aug. 9, 1994, which is hereby expressly incorporated by reference.

With reference to FIG. 4, the conveyor system 10 tracks loads (L1-L3) as they exit a source station 30. As the loads L1-L3 exit the source station 30, the source station sensor 54 detects the trailing edge of the loads. Therefore, as loads L1-L3 enter the first conveyor segment 20*a*, the controller 70 creates a load record in a first data array 76*a* for each load. The load record associated with each load may include any information needed to track, describe and route the load. Information associated with each load may be provided to the controller 70 by any known means including bar code readers, frequency tag readers, weigh scales, profiling sensors, vision systems, operator keyboards or any other devices connected to and in communication with the controller. In the illustrated embodiment, the controller 70 tracks each load as a single point, specifically the trailing edge. By only tracking the trailing edge of a load, and not calculating the size of the load for tracking purposes, the controller does not require as much processing power. In some embodiments, the controller may measure and associate a load size to each load for control purposes. The load size for control purposes may be measured by counting the pulse signals from the encoder 50 between the leading edge and trailing edge of a load. Of course other methods may be used in determining the size of the load for control purposes. One skilled in the art should readily recognize that separate controllers may be used for tracking and control purposes.

Figure 6:
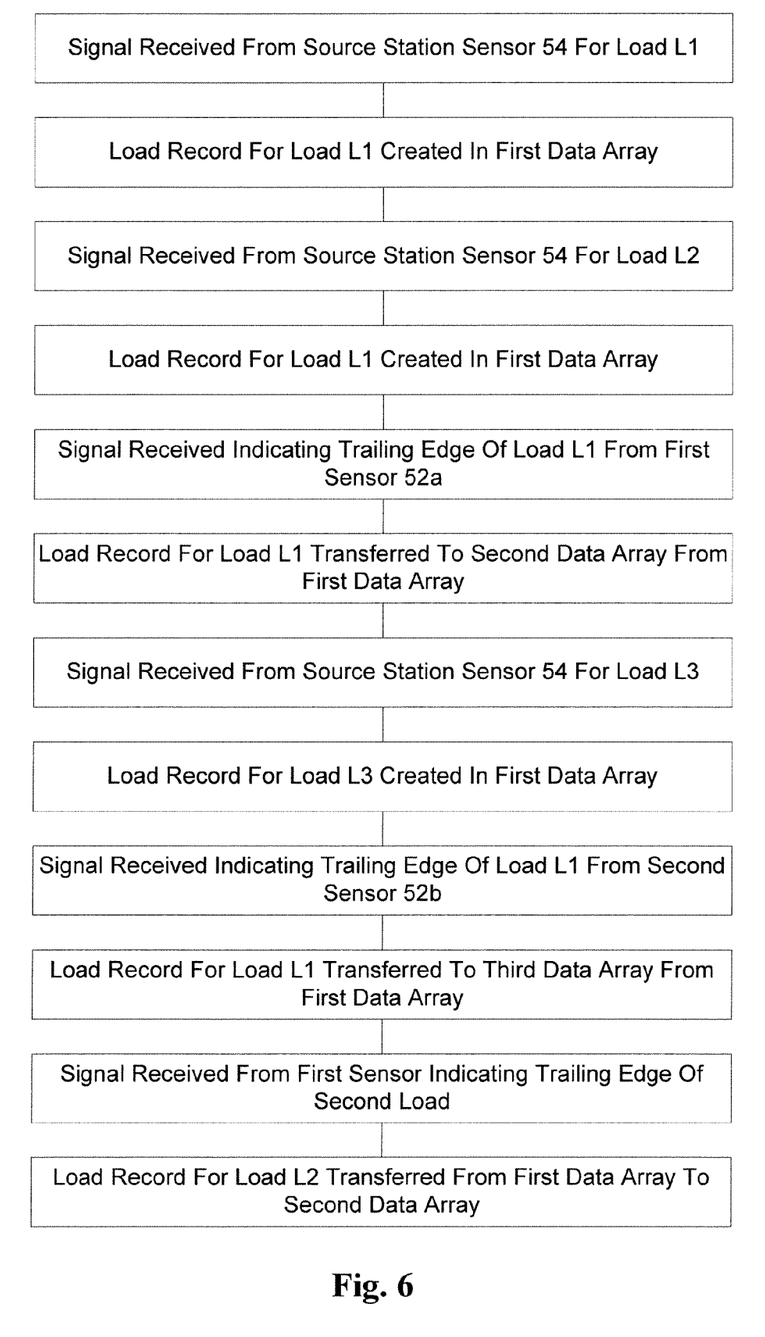
FIG. 6 is a flow chart diagram outlining the processing steps in tracking a bag moving along the baggage handling system shown in FIG. 4.

With reference to FIGS. 2, 4 and 6, the operation of the conveyor system will be described in greater detail. As the first load L1 passes along the conveyor system 10 to the illustrated position, the first load passes the source station sensor 54, which provides a signal to the controller 70. The source station sensor 54 may use either the trailing edge or the leading edge of the load to initiate identification of a load and thereby tracking of a load. In the illustrated embodiment, the controller 70 creates a load record for the first load L1 in a first data array 76*a* associated with the first conveyor segment 20*a* when the source station sensor 54 senses the trailing edge of the first load. The controller 70 than tracks the first load L1 along the first conveyor segment 20*a* using the first encoder 50*a*. This process is then repeated as a second load L2 exits the source station 30 and enters the first conveyor segment 20*a*. More specifically, the controller 70 creates a load record for the second load L2 in the first data array 76*a* upon the source station sensor 54 indicating the trailing edge of a second load. As the trailing edge of the first load L1 passes the first sensor 52*a* associated with the first conveyor segment 20*a*, the controller 70 transfers the load record for the first load from the first data array 76*a* to the second data array 76*b*. Each data array may be arranged as a list or have any other suitable organizational structure for tracking a load. The controller then continues to track the first load L1 along the second conveyor segment 20*b* and the second load L2 along the first conveyor segment 20*a*. Using the illustrated configuration in FIG. 4, the trailing edge of the first load L1 reaches the second sensor 52*b* before the trailing edge of the second load L2 reaches the first sensor 52*a*. Therefore, the load record for the first load L1 is transferred from the second data array 76*b* to a third data array 76*c* as the trailing edge of the first load passes the second sensor 52*b* while the first load moves from the second conveyor segment 20*b* to the third conveyor segment 20*c*. As the third load L3 enters the first conveyor segment 20*a* from the source station 30, a load record is created in the manner described above in relation to tracking the first and second loads. The second and third loads L2, L3 are also tracked and transferred between conveyor segments in the same manner as the first load L1. Subsequent loads may be tracked in a manner similar to the first and second loads, by creating a load record at the source station 30 in the first data array 76*a* associated with the first conveyor segment 20*a* and then transferring the load record to the next data array when a sensor senses the trailing edge of the load as that load enters the next conveyor segment. As many conveyor segments as needed may be added, along with the associated data arrays.

In tracking a load, the controller 70 creates an expectation window for each load. This expectation window may be updated if a particular load does not arrive within the expectation window due to slippage of a load on a particular conveyor segment. More specifically, the controller tracks the load as it moves to the next sensor 52 using the encoder 50 to estimate movement of the load. As soon as a load record is created in a data array, the controller attaches a distance field to the load record and each time the encoder 50 sends a pulse, the controller reduces this distance field. Therefore, as the load moves, a distance field counts down so that the distance field always contains a theoretical value corresponding to the distance from the trailing edge of the load the next sensor. If the load does not arrive within the expected time or an expected window of time, the controller may wait until the trailing edge of a load is sensed and then create a correction factor to allow for slippage of the load on a conveyor segment. This correction factor may then be used to adjust the expectation window of the remaining loads. A more detailed explanation of creating and using an expectation window in tracking a load using the leading edge of a load is further described in U.S. Pat. No. 5,335,777, entitled "Method and Apparatus for Belt Conveyor Load Tracking", issued Aug. 9, 1994, which may be modified to use the present invention's method of using the trailing edge of a load for tracking.

As illustrated in FIG. 5, the controller 70 also may track a load having a length greater than the distance between a set of sensors, because the controller only tracks the load as a single data point, specifically the trailing edge. When the second load L2 exits the source station 30, the source station load sensor 54 detects the trailing edge of second load and the controller 70 creates a load record for second load in the first data array 76a associated with conveyor 20a. Even though second sensor 52b detects the leading edge of second load L2 before first sensor 52a detects the trailing edge, the load record remains in first data array 76a until first sensor 52a detects the trailing edge, at which time the load record is transferred to second data array 76b. Likewise, the load record remains in the second data array 76b until second sensor 52b detects the trailing edge of the load. Therefore, the problems associated with using both leading and trailing edges to track loads having a length greater than the distance between a set of sensors are avoided, and the control steps and processing requirements are reduced.

The "trailing edge" tracking technique has many benefits over prior methods, including the "leading edge" tracking technique as well as using both a leading edge and a trailing edge for tracking or a selective mixture of leading and trailing edges. One benefit is that the "trailing edge" technique treats each load as a single point, thereby reducing the required processing power to calculate load size. Another benefit is that ghost conditions related to the stopping of a conveyor segment, as illustrated in FIG. 1a, are eliminated, because the load record is not passed to the next conveyor segment until the sensor located near the end of a conveyor segment senses the trailing edge of a load, and the bag is physically on the next conveyor segment. Race conditions are also eliminated. By sensing the trailing edge only, the size of the load is irrelevant. More specifically, if a load has a length greater than the distance between the two sensors, by only sensing the trailing edge, the controller does not create extra loads by sensing a leading edge of a load not yet transferred. Other benefits include eliminating the processing steps associated with calculating the size of a load, using an encoder and elimination of extra memory needed to hold a load record until the trailing edge is sensed.

The present invention also allows a single sensor to be used for both leading edge control and trailing edge tracking. For example, an application may require a series of short conveyor segments to control the rate of loads into a processing area. The conveyors segments start and stop based on sensors located at the ends of the conveyor segments detecting the leading edge of the loads. The detection of the trailing edge of loads by these same sensors provides tracking of said loads.

The embodiment of the present invention is described and illustrated herein as using a "leading edge" technique for the control function and "trailing edge" technique for tracking function. While other approaches may be used based on the demands of a particular application, decoupling of control and tracking functions further benefit retrofitting existing systems. For example, if an existing baggage handling system using conventional "leading edge" tracking and control, the system may be improved by selectively implementing the "trailing edge" technique of the present invention for tracking a load while use the leading edge of a load for control.

In summary, the present invention uses the trailing edge of the load for tracking purposes. The trailing edge, leading edge or trailing and leading edge may be used for controlling the conveyor system. By separating the tracking of the load from the control of the conveyor and further only using the trailing edge for tracking, the number of required processing steps used to track a load is reduced. Use of only the trailing edge in tracking further eliminates potential race conditions, ghost loads and other problems commonly found with techniques using the leading edge of the load or both the leading and trailing edges of a load for tracking. The system may use sensors that detect both the leading edge and trailing edge of the load, but the controller only uses the trailing edge of the load for tracking purposes.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of tracking a load having a trailing edge and a leading edge, the load being conveyed on a conveyor system having a first sensor, said method comprising the steps of:

sensing only the trailing edge of the load with the first sensor;

updating a load record for the load in response to sensing only the trailing edge of the load with the first sensor; and tracking the load throughout the conveyor system.

2. The method of claim 1 wherein said conveyor system includes a first conveyor segment and a second conveyor segment arranged relative to the first conveyor segment to transfer the load from the first conveyor segment to the second conveyor segment and wherein said conveyor system further includes a first data array associated with the first conveyor segment and a second data array associated with the second conveyor segment and wherein said step of updating the load record further includes the step of transferring the load record from the first data array to the second data array upon sensing the trailing edge of the load with the first sensor.

3. The method of claim 2 wherein said conveyor system further includes a source sensor and wherein said method further includes the step of generating a load record upon sensing the load with the source sensor before said step of updating the load record.

4. The method of claim 3 wherein said step of generating a load record upon sensing a load with the source sensor further includes the steps of:
sensing the trailing edge of the load with the source sensor; and
inputting the load record into the first data array.

5. The method of claim 2 wherein said conveyor system further includes a second sensor associated with the second conveyor segment, said method further including the steps of:
sensing the trailing edge of the load with the second sensor; and
removing the load record from the second data array upon sensing the trailing edge of the load with the second sensor.

6. The method of claim 5 wherein said conveyor system includes a third conveyor segment having an associated third data array, said method further comprising the step of adding the load record to the third data array after removing the load record from the second data array.

7. A method of tracking a load on a conveyor system and of controlling the conveyor system wherein the load includes a trailing edge and a leading edge and wherein the conveyor system includes a first conveyor segment and a source load sensor associated with the first conveyor segment, the load sensor being in communication with a controller, said method comprising the steps of:
sensing the trailing edge of the load with the source load sensor;
updating a load record in the controller only in response to sensing the trailing edge of the load;
generating a pulse signal having a number of pulses directly proportional to the travel of the load on the first conveyor segment; and
tracking the load on the first conveyor segment using the generated pulse signal and load record updated in response to sensing the trailing edge of the load.

8. The method of claim 7 further including the steps of:
sensing the leading edge of the load; and
controlling the operation of the individual conveyor segments using the leading edge of the load.

9. The method of claim 7 wherein said conveyor system includes a second conveyor segment and a first sensor associated with the first conveyor segment and wherein said step of updating a load record in the controller further includes the step of updating a distance field comprising the distance between the trailing edge of the load and the first sensor upon sensing the trailing edge of the load with the source sensor.

10. The method of claim 9 further including the step of reducing the distance field in response to each generated pulse.

11. The method of claim 8 wherein the conveyor system further includes a first sensor associated with the first conveyor segment, and a second conveyor segment, said method further comprising the steps of:
sensing the trailing edge of the load by the first sensor; and
updating a first data array associated with a first conveyor segment upon sensing the trailing edge.

12. The method of claim 9 further including the steps of:
sensing the leading edge of the load by the first sensor;
controlling the movement of the load on the first and second conveyor segments upon sensing the leading edge.

13. The method of claim 11 wherein said step of updating a first data array associated with the first conveyor segment further includes the step of transferring a load record in the first data array to a second data array associated with the second conveyor segment.

14. A conveyor system for tracking a load having a leading edge and a trailing edge, said system comprising:
a first conveyor segment;
a second conveyor segment arranged relative to said first conveyor segment to transfer the load from said first conveyor segment to said second conveyor segment;
a first sensor operatively associated with said first conveyor segment, said first sensor being configured to sense the trailing edge of the load;
a controller communicating with said first sensor, said controller configured to update and transfer load records from a first data array associated with said first conveyor segment to a second data array associated with said second conveyor segment only in response to said first sensor sensing the trailing edge of the load.

15. The conveyor system of claim 14 further including:
a source sensor in communication with the controller, said source sensor and said first sensor being located at opposing ends of said first conveyor segment, said controller generating a load record in said first data array upon said source sensor sensing the trailing edge of the load.

16. A method of tracking a load having a trailing edge and a leading edge, the load being conveyed on a conveyor system having a first sensor, said method comprising the steps of:
creating and storing information regarding the load in a load record of a controller;
sensing only the trailing edge of the load with the first sensor;
updating the load record for the load in response to sensing only the trailing edge of the load with the first sensor; and
tracking only the trailing edge of the load throughout the conveyor system by periodically updating the load record for the load in response to sensing only the trailing edge of the load.

17. The method of claim 16 wherein said conveyor system includes a first conveyor segment and a second conveyor segment arranged relative to the first conveyor segment to transfer the load from the first conveyor segment to the second conveyor segment and wherein said conveyor system further includes a first data array associated with the first conveyor segment and a second data array associated with the second conveyor segment and wherein said step of updating the load record further includes the step of transferring the load record from the first data array to the second data array upon sensing the trailing edge of the load with the first sensor.

* * * * *